United States Patent
Afzal et al.

(10) Patent No.: US 11,903,047 B2
(45) Date of Patent: *Feb. 13, 2024

(54) SERVICE-BASED POLICY FOR CELLULAR COMMUNICATIONS

(71) Applicant: T-Mobile USA, Inc., Bellevue, WA (US)

(72) Inventors: Muhammad Waqar Afzal, Bellevue, WA (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,691

(22) Filed: Jan. 20, 2023

(65) Prior Publication Data

US 2023/0156829 A1    May 18, 2023

Related U.S. Application Data

(63) Continuation of application No. 16/788,921, filed on Feb. 12, 2020, now Pat. No. 11,564,265.

(51) Int. Cl.
*H04W 76/16* (2018.01)
*H04W 76/10* (2018.01)

(52) U.S. Cl.
CPC ................ *H04W 76/10* (2018.02)

(58) Field of Classification Search
CPC ..... H04W 76/10; H04W 76/16; G06F 16/211; G06F 16/258
See application file for complete search history.

(56) References Cited

U.S. PATENT DOCUMENTS

| | | | |
|---|---|---|---|
| 10,541,911 B2 | 1/2020 | Ni | |
| 10,638,400 B1 | 4/2020 | Xu | |
| 11,564,265 B2 * | 1/2023 | Afzal | ............ H04W 76/16 |
| 2010/0062781 A1 | 3/2010 | Dolganow | |
| 2016/0294682 A1 | 10/2016 | Bi | |
| 2018/0049086 A1 * | 2/2018 | Bouvet | ............ H04W 48/20 |
| 2020/0022076 A1 | 1/2020 | Yao | |
| 2020/0045770 A1 | 2/2020 | Hu | |
| 2020/0305211 A1 * | 9/2020 | Foti | ............ H04M 15/57 |
| 2020/0322834 A1 * | 10/2020 | Huang-Fu | ......... H04W 28/0268 |
| 2020/0383035 A1 | 12/2020 | Ma | |
| 2021/0084524 A1 | 3/2021 | Foti | |
| 2021/0218849 A1 | 7/2021 | Cai | |

(Continued)

OTHER PUBLICATIONS

Office Action (Non-Final Rejection) dated May 17, 2022 for U.S. Appl. No. 16/788,921 (pp. 1-10).

(Continued)

*Primary Examiner* — Joseph E Dean, Jr.
(74) *Attorney, Agent, or Firm* — Lee & Hayes, P.C.

(57) ABSTRACT

A system uses deep packet inspection and a services policy database to select policy control functions based on services associated with a packet data session rather than an access point name or data network name. As a packet data session is initiated, a system management function (SMF) determines a service associated with the session and routes a policy request to one of several policy control functions (PCF or PCRF) depending on the service. Policies specific to the service may be chosen and enforced at the selected PCF/PCRF.

14 Claims, 5 Drawing Sheets

(56) References Cited

U.S. PATENT DOCUMENTS

| | | |
|---|---|---|
| 2021/0219179 A1 | 7/2021 | Narath |
| 2021/0251018 A1 | 8/2021 | Afzal |
| 2022/0103985 A1 | 3/2022 | Khasnabish |

OTHER PUBLICATIONS

Office Action (Notice of Allowance and Fees Due (PTOL-85)) dated Sep. 28, 2022 for U.S. Appl. No. 16/788,921 (pp. 1-7).
Office Action dated Dec. 1, 2021 for U.S. Appl. No. 16/788,921 (pp. 1-13).
Office Action dated May 12, 2021 for U.S. Appl. No. 16/788,921 (pp. 1-11).

* cited by examiner

SERVICE-BASED POLICY FOR CELLULAR COMMUNICATIONS

CROSS-REFERENCE TO RELATED APPLICATION

The is a continuation application of U.S. patent application Ser. No. 16/788,921, filed on Feb. 12, 2020, whose disclosure is incorporated by reference in its entirety herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

3GPP architectures specify that a policy for a session is selected based on the connection point, that is, the Access Point Name (APN) for 4G or the Data Network Name (DNN) for 5G. These architectures specify that the same policy applies for all packet data sessions via that connection point.

SUMMARY

A service-based policy architecture allows multiple policies to be applied to different services accessing the same APN/DNN. A gateway may inspect packets for content indicating the service and direct the session to different policy charging and rule functions (PCRFs) so that each service may be handled separately.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

As a mobile device can (and usually does have) have several IP addresses (or IPv6 prefixes) at once, for example, one for Internet access and one for operator services such as voice over LTE (VoLTE), each is bound to a different virtual network interface on the device. In this case, several protocol data unit (PDU) sessions are established simultaneously. Each is identified with a (human readable) name which in 2G, 3G and 4G networks was referred to as the APN (Access Point Name). In the 5G core, it is referred to as the DNN (Data Network Name).

Each session is how controlled by a set of policies according to the APN/DNN. For example, the subscriber may be charged based on use of a high volume application or have volume limits applied during peak usage hours. However, only one set of policies may be applied to each session according to the policy and charging rules function (PCRF) associated with the APN/DNN.

A system in accordance with the current disclosure performs a deep packet inspection on protocol data units (PDUs) to determine a service with which the PDU is associated. The PCRF and therefore the policy for a particular packet session associated with those PDU's is then selected based on the service rather than the APN/DNN for that session.

Figure 1:
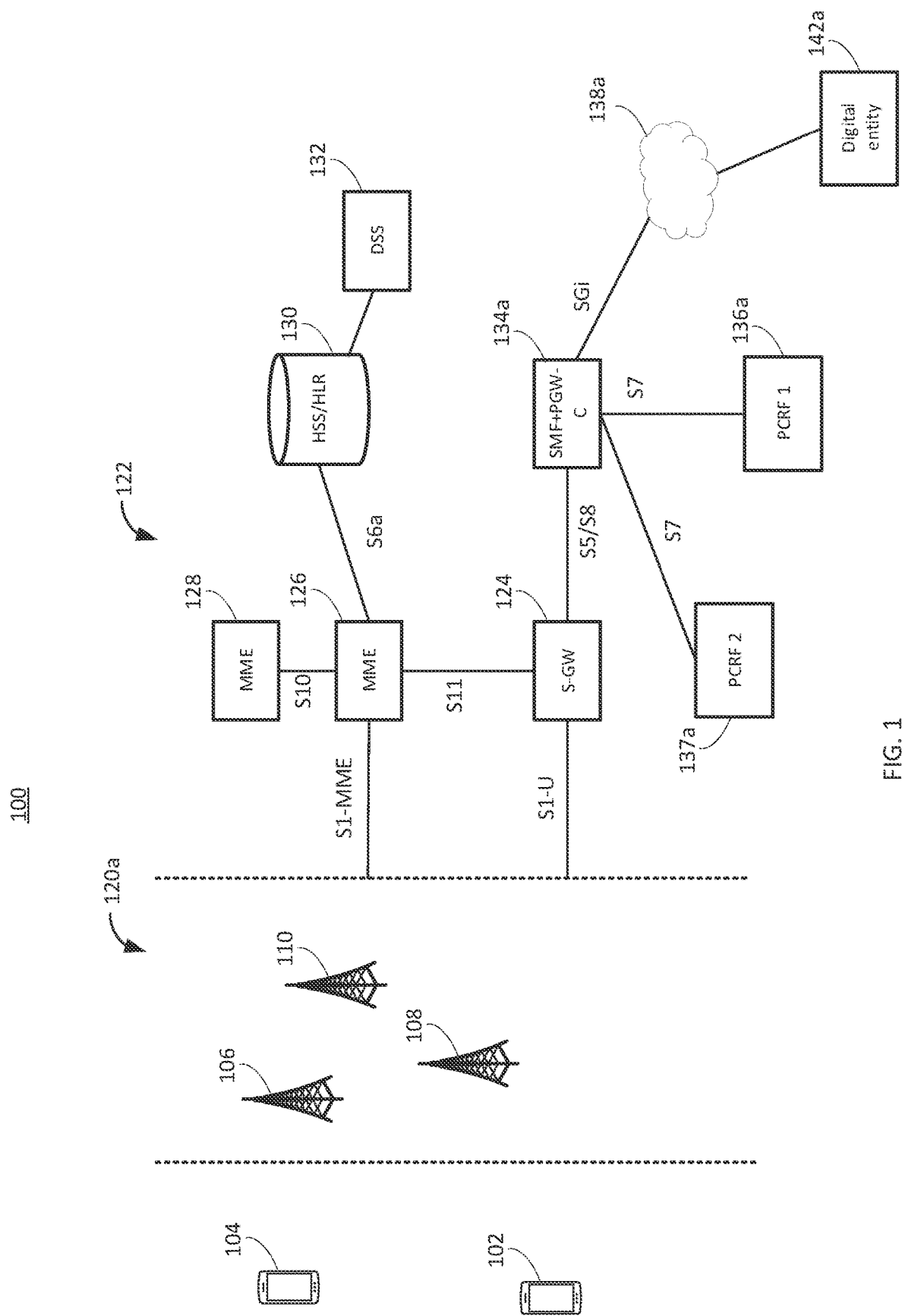
FIG. 1 is an simplified and exemplary block diagram of a 4G cellular communication system in accordance with the current disclosure.

Turning to FIG. 1, a block diagram illustrates an exemplary embodiment of a system 100 in accordance with the current disclosure. The system 100 may include a plurality of subscriber devices 102, 104 in communication with a radio access network (RAN) 120 including cell sites 106, 108, 110 and other infrastructure equipment not depicted in FIG. 1.

Managing communication between subscriber devices and between a subscriber device and an external data entity (the outside world) 142, is a core network 122, called in a 4G LTE example, the evolved packet core (EPC). The core network 122 illustrated here is greatly simplified for the sake of clarity. A serving gateway 124 may act as a router between cell sites 106, 108, 110 and the rest of traffic-oriented components. Mobility management entities (MMEs) 126, 128 manage signaling to the base stations including call set up and handoffs. A home subscriber server (HSS) 130 may be a central database that contains information about all the subscribers to the operator's communication system 100. In older communication system configurations the role of the HSS was performed by a home location registry (HLR). The HSS 130 may provide other system components with subscriber operational information. The functions and data associated with a prior art HSS may be found in several standards documents such as 3GPP TS 22.041. A dynamic subscriber profile service (DSS) 132 manages subscriber profiles. In some embodiments, the DSS 132 may be embodied within the HSS 130. In other embodiments, an equipment identity register (EIR) may be incorporated in the DSS 132 for device whitelisting and blacklisting among other functions. A session management function-packet data network gateway control (packet data gateway, or P-GW) 134*a* may handle communication between subscriber devices 102, 104 and the outside world or endpoint, the digital entity 142*a*. The digital entity 142*a* may be coupled to the core network via access point 138*a*.

Policy servers 136*a* and 137*a*, known separately in the 4G example as a policy control and charging rules function (PCRF) are responsible for control decision-making and flow-based charging. In an embodiment, the policy server 136*a* may instruct the P-GW 132 to enforce the PCRF's decisions via a policy control enforcement function (not depicted in FIG. 1) which may reside in the P-GW 132*a*. In a prior art embodiment, the selection of a policy server would be made by the P-GW 132 based on the APN being accessed, in this example, the APN 138*a*. As described herein, the P-GW 132*a* may select from multiple PCRFs 136*a*, 137*a* based on the service associated with a data communication, described in more detail below.

Figure 2:
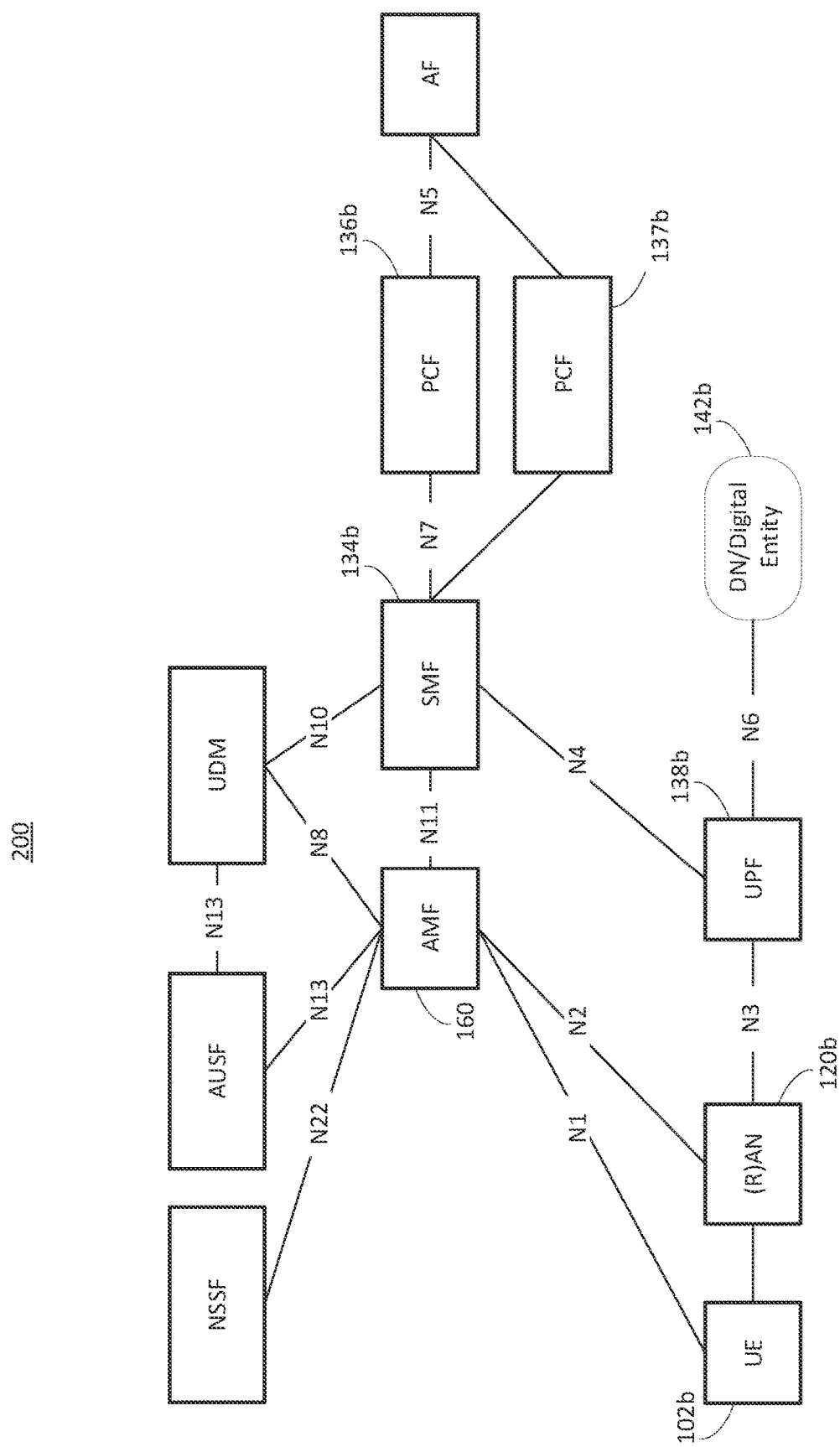
FIG. 2 is an simplified and exemplary block diagram of a 5G cellular communication system in accordance with the current disclosure.

FIG. 2 illustrates a cellular communication network 200 supporting 5G communications. Reference numbers from FIG. 1 are reused for corresponding roles/functions in FIG. 2. A subscriber device 102b may be connected to the network via a radio access network 120b. In this example, the subscriber device 102b may also be connected to an Access and Mobility Management Function (AMF) 160. A session management function (SMF) 134b. The SMF 134b is responsible for checking whether requests from the subscriber device 102b are compliant with the user's subscription including session types and quality of service (QoS) limits using policies stored in a first policy control function 136b and a second policy control function 137b. That is, the SMF 134b selects a PCF that is used for policy identification and enforcement. The user plane function (UPF) 138b provides the interface to the outside world, illustrated as digital entity 142b. As above, in the prior art implementation, the SMF 134b selects a PCF 136b or 137b based on the data network name (DNN) to which a particular data session is connected. In the network 200 in accordance with the current disclosure, the SMF 134b may select a PCF based on the service associated with the data session, not its DNN. The selection of more than one PCF 136b or 137b allows policy settings, such as service levels, to be tailored by application/service rather than by a data connection's access point.

Figure 3:
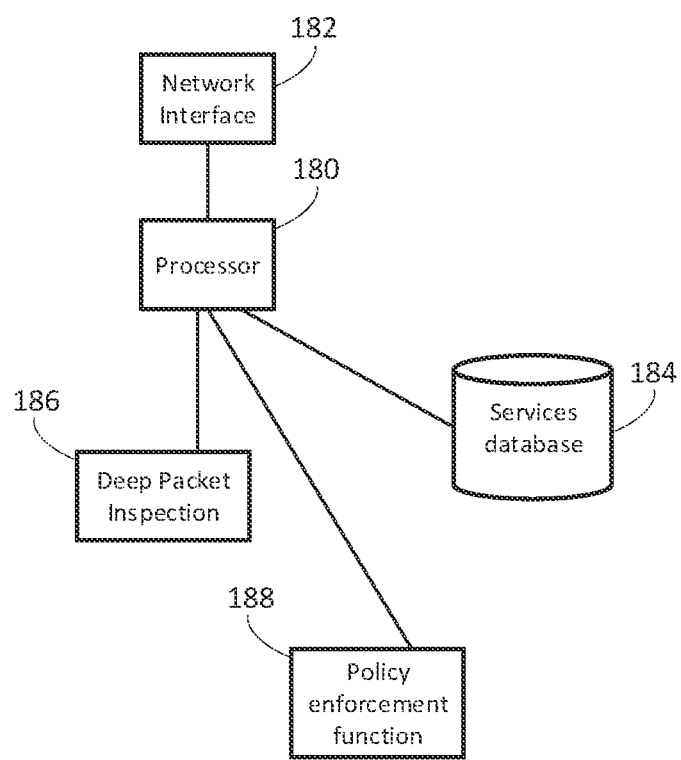
FIG. 3 is a block diagram of an exemplary system management function in accordance with the current disclosure.

Two elements of the networks 100 and 200 support the service-based selection of policy control functions. FIG. 3 illustrates an exemplary session management function 134. The SMF 134 may include a network interface 180 coupled to a processor 182. The processor 182 may be connected to a services database 186 that stores information about the various services supported by the networks 100 and 200. These services may include, but are not limited to, voice over LTE (VOLTE), rich communication services (RCS), support for various Internet of Things (IoT) devices, or services that allow the use of one phone number across multiple devices such as T-Mobile's DIGITs service.

For example, a system in accordance with the current disclosure allows one PCRF/PCF to be selected for a Voice over LTE (VOLTE) service while a different PCRF/PCF to be selected for a Rich Communication Service (RCS) for communications from the same subscriber device 102. In another embodiment, a subscriber device supporting separate 4G and 5G sessions using different IP Media Subsystems (IMS) may be directed to separate PCRFs 136a, 137a, 136b, 137b.

An exemplary session management function (SMF) 134a, 134b is illustrated in FIG. 3. The SMF 134a, 134b may include a processor 180 coupled to a network interface 182 used to communicate with other components of the system 100, 200. A services database 184 may hold a list of services supported by the system 100, 200, such as VOLTE and video over LTE (VILTE). A deep packet inspection module 186 may inspect packets to determine not only their origin and destination but the type of service with which the packet's session is associated. The deep packet inspection module 186 may reference the services database 184 to match data found in packets to supported services. A policy enforcement function 188 of the SMF 134a, 134b may enforce policies selected via the PCRF 136a, 137a, 136b, 137b as well as its own policies related, for example, to QoS.

Figure 4:
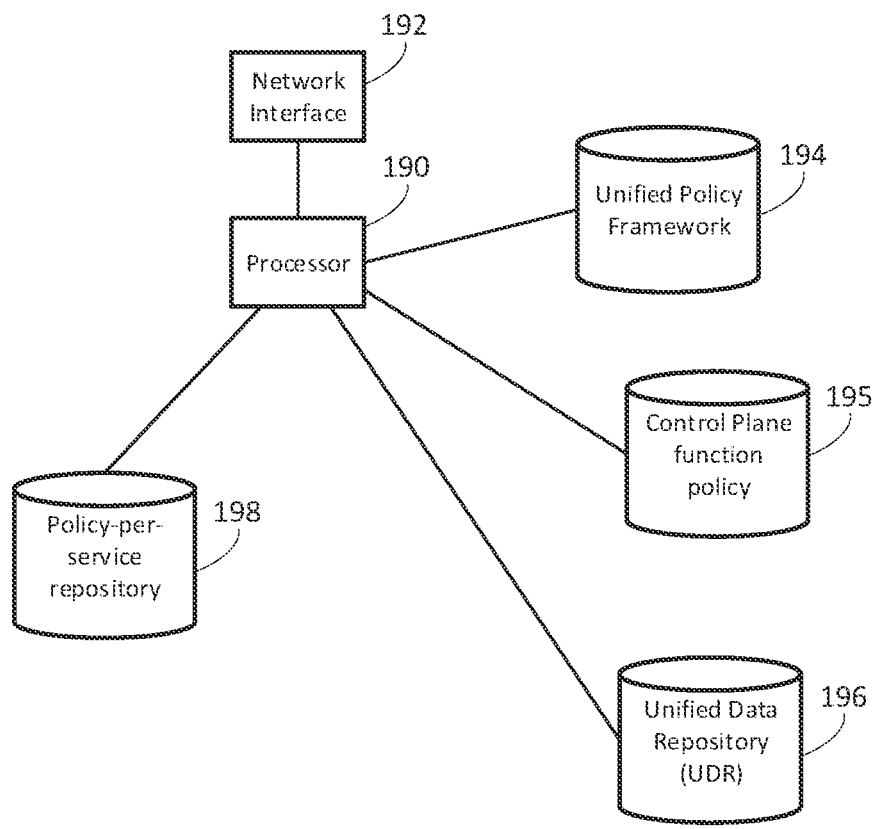
FIG. 4 is a block diagram of an exemplary policy control function in accordance with the current disclosure.

FIG. 4 illustrates an exemplary PCF/PCRF 136. The PCF/PCRF 136 may include a processor 190 coupled to a network interface 192 used to communicate with other system elements. The PCF/PCRF 136 may also include a unified policy framework (UPF) 194, and for 5G systems, a control plane function policy 195. Another component of the PCF/PCRF 136 may be a unified data repository (UDR) 196 that may be used to store, among other things, packet flow descriptions for application detection and subscription data.

A policy-per-service repository 198 may store policies such as data limits, QoS settings, and pricing related to specific services. In accordance with the current disclosure, these policies may differ between PCRF's, such as PCRC 136a and 137a or PCF 136b and 137b. The ability to direct policy requests related to a data session's service is supported, in part, by the service-based policy repository 198.

Figure 5:
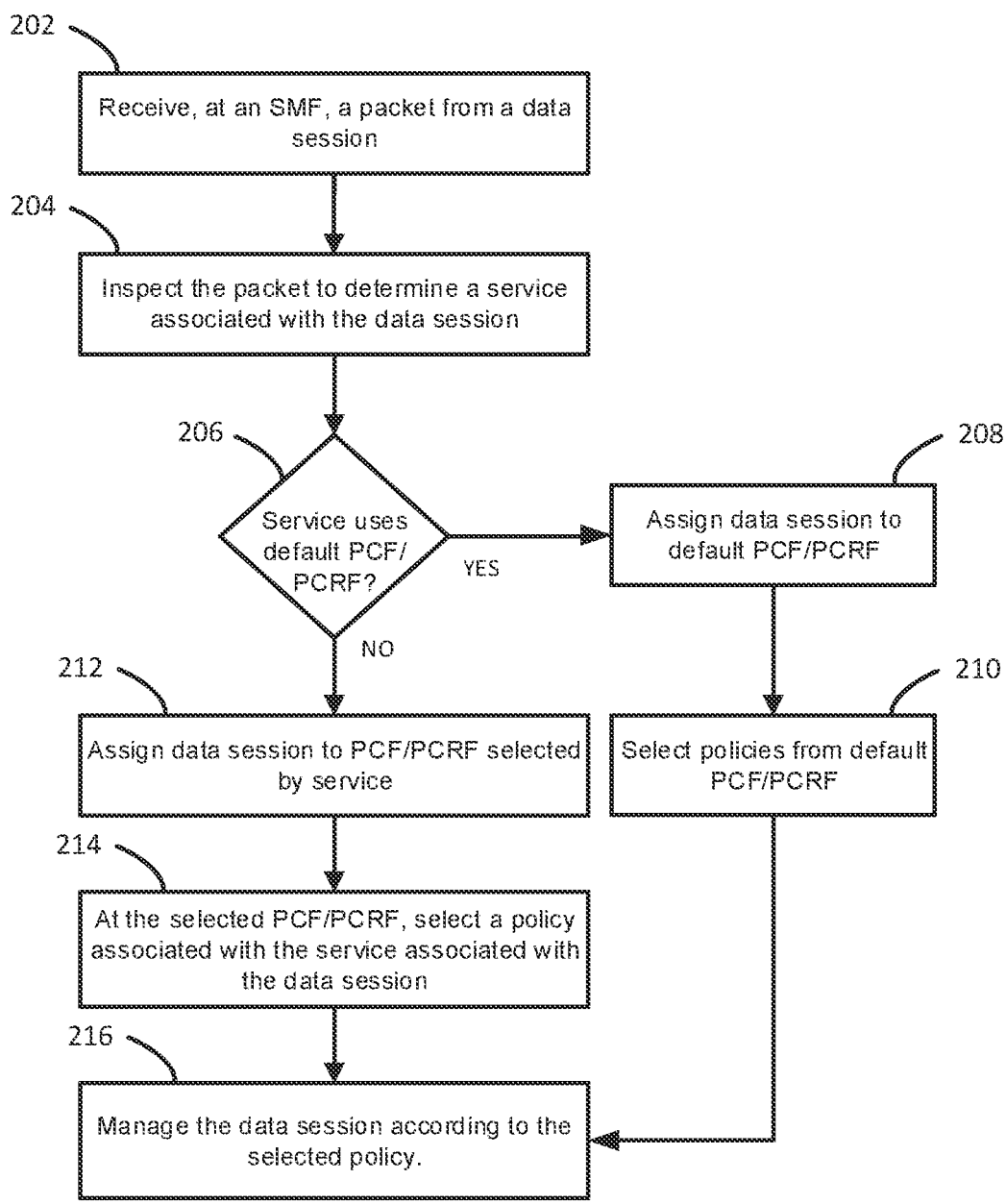
FIG. 5 is a flowchart of a method implementing a service-based policy for cellular communications.

A method 200 of implementing a service-based policy for cellular communications is illustrated in the flowchart of FIG. 5. At block 202, a data packet may be received at an SMF/P-GW 134, the data packet being associated with a data communication session, for example, a voice call or an internet query. In an embodiment, the packet may not include actual user data but may be associated with the setup of the data communication session between endpoints. The SMF/P-GW 134 may inspect not only the packet header but may inspect the contents of the packet (deep packet inspection) to determine a service associated with the data communication session. The service may be compared at block 206 to a list of services, for example, stored in a services database 184 to determine if a special PCF/PCRF should be invoked. If not, a default PCF/PCRF, for example, PCRF 136a or PCF 136b may be selected based on the data session's APN/DNN, as done in the prior art. The default PCF/PCRF 136a, 136b, at block 210, may identify the appropriate policy or policies according to the service information passed from the SMF/P-GW 134. Other system elements, including the SMF/P-GW 134 may manage the data session using the selected policies at block 216. As discussed above, these policies may apply to allowable use, data limits, bandwidth restrictions, and more.

Returning to block 206, when the service identified does not use the default setting, the 'no' branch may be taken to block 212 where a different PCF/PCRF, such as PCF 137b, may be selected and a message may be sent to the selected PCF/PCRF. At block 214, a policy or policies appropriate to the identified service may be selected and used, at block 216 to manage the data session.

At least one technical effect is the ability to expand the capability of 4G and 5G systems to increase the system flexibility related to policies managing different types of data sessions according to the service associated with that data session.

The current system and method benefit both users and system providers by allowing more flexibility in managing data sessions including bandwidth, data limits, and tariffs associated with different data sessions between the same subscriber device via the same APN/DNN.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

What is claimed is:

1. A computerized method of operating a cellular communication system, the method comprising:
    establishing a data connection between a mobile device and a digital entity external to the cellular communication system;
    within the data connection, identifying a request for one of a plurality of data packet sessions;
    in response to identifying, inspecting the request via a deep packet inspection module of a session management function-packet data network gateway-control (SMF+PGW-C), wherein the SMF+PGW-C is configured to execute computer-executable instructions for a policy control function (PCF) coupled thereto;
    determining, by the deep packet inspection module, a service, an origin, and a destination associated with a plurality of data packets in the plurality of data packet sessions, wherein the plurality of data packets further comprises user data and session data;
    in accordance with the digital entity and the service associated with the plurality of data packets, connecting to a policy database of the PCF, wherein the PCF is configured to select a policy for the plurality of data packets according to the service of the plurality of data packets;
    for at least one protocol data unit within the one of the plurality of data packet sessions to determine a first service with which the at least one protocol data unit is associated, wherein the at least one protocol data unit comprises first user data and first session data; and
    in response to determining the first service, selecting, by a policy control function (PCF) coupled with the SMF+PGW-C, a policy from a policy database coupled with the PCF for governing the one of the plurality of data packet sessions corresponding to the first service.

2. The computerized method of claim 1, further comprising:
    identifying a second request for a second of the plurality of the data packet sessions within the data connection;
    inspecting the second request for second set of protocol data unit within the second of the plurality of the data packet sessions in the second request;
    determining a second service associated with the second of the plurality of the data packet sessions as function of the second set of protocol data unit;
    determining, by the SMF+PGW-C, that a second service associated with the second of the plurality of the data packet sessions within the data connection is different from the first service;
    routing a second policy request to a second PCF based on the second service; and
    at the second PCF, selecting a second policy different from the policy, wherein the second policy corresponds to the second service.

3. The computerized method of claim 1, further comprising: receiving an instruction from a user specifying service levels on an application-by-application basis for applications on mobile device that uses the data connection.

4. The computerized method of claim 2, wherein the first service is a voice over LTE (VOLTE) service and the second service is a rich communication service (RCS).

5. The computerized method of claim 2, wherein the data connection is a first Gx Interface for a 4G system or a 5G system.

6. The computerized method of claim 2, wherein the first service is a data Internet of Things (IoT) service and the second service is a VOLTE IoT service.

7. The computerized method of claim 2, wherein the first service is a VOLTE service and the second service is a video over LTE (VILTE) service.

8. A computerized method of servicing a cellular communication system:
    establishing a data connection between a mobile device and a digital entity external to the cellular communication system;
    within a data connection established between a mobile device and a digital entity, identifying a request for one of a plurality of data packet sessions;
    in response to identifying, inspecting the request via a deep packet inspection module of a session management function-packet data network gateway-control (SMF+PGW-C), wherein the SMF+PGW-C is configured to execute computer-executable instructions for a policy control function (PCF) coupled thereto;
    determining, by the deep packet inspection module, a service, an origin, and a destination associated with a plurality of data packets in the plurality of data packet sessions, wherein the plurality of data packets further comprises user data and session data;
    in accordance with the digital entity and the service associated with the plurality of data packets, connecting to a policy database of the PCF, wherein the PCF is configured to select a policy for the plurality of data packets according to the service of the plurality of data packets;
    for at least one protocol data unit within the one of the plurality of data packet sessions to determine a first service with which the at least one protocol data unit is associated, wherein the at least one protocol data unit comprises first user data and first session data; and
    in response to determining the first service, selecting, by a policy control function (PCF) coupled with the SMF+PGW-C, a policy from a policy database coupled with the PCF for governing the one of the plurality of data packet sessions corresponding to the first service.

9. The computerized method of claim 8, further comprising:
    identifying a second request for a second of the plurality of the data packet sessions within the data connection;
    inspecting the second request for second set of protocol data unit within the second of the plurality of the data packet sessions in the second request;
    determining a second service associated with the second of the plurality of the data packet sessions as function of the second set of protocol data unit;
    determining, by the SMF+PGW-C, that a second service associated with the second of the plurality of the data packet sessions within the data connection is different from the first service;
    routing a second policy request to a second PCF based on the second service; and
    at the second PCF, selecting a second policy different from the policy, wherein the second policy corresponds to the second service.

10. The computerized method of claim 8, further comprising: receiving an instruction from a user specifying service levels on an application-by-application basis for applications on mobile device that uses the data connection.

11. The computerized method of claim 9, wherein the first service is a voice over LTE (VOLTE) service and the second service is a rich communication service (RCS).

12. The computerized method of claim 9, wherein the data connection is a first Gx Interface for a 4G system or a 5G system.

13. The computerized method of claim 9, wherein the first service is a data Internet of Things (IoT) service and the second service is a VOLTE IoT service.

14. The computerized method of claim 9, wherein the first service is a VOLTE service and the second service is a video over LTE (VILTE) service.

\* \* \* \* \*